Oct. 8, 1968   L. S. WILLIAMS   3,404,744
DISENABLING MECHANISM FOR LEVER IN RATIO BALANCE
Filed Aug. 12, 1966   3 Sheets-Sheet 1

INVENTOR.
LAWRENCE S. WILLIAMS, DECEASED,
BY AUSTIN M. FREASE, EXECUTOR,

BY Thomas H. Grafton
ATTORNEY

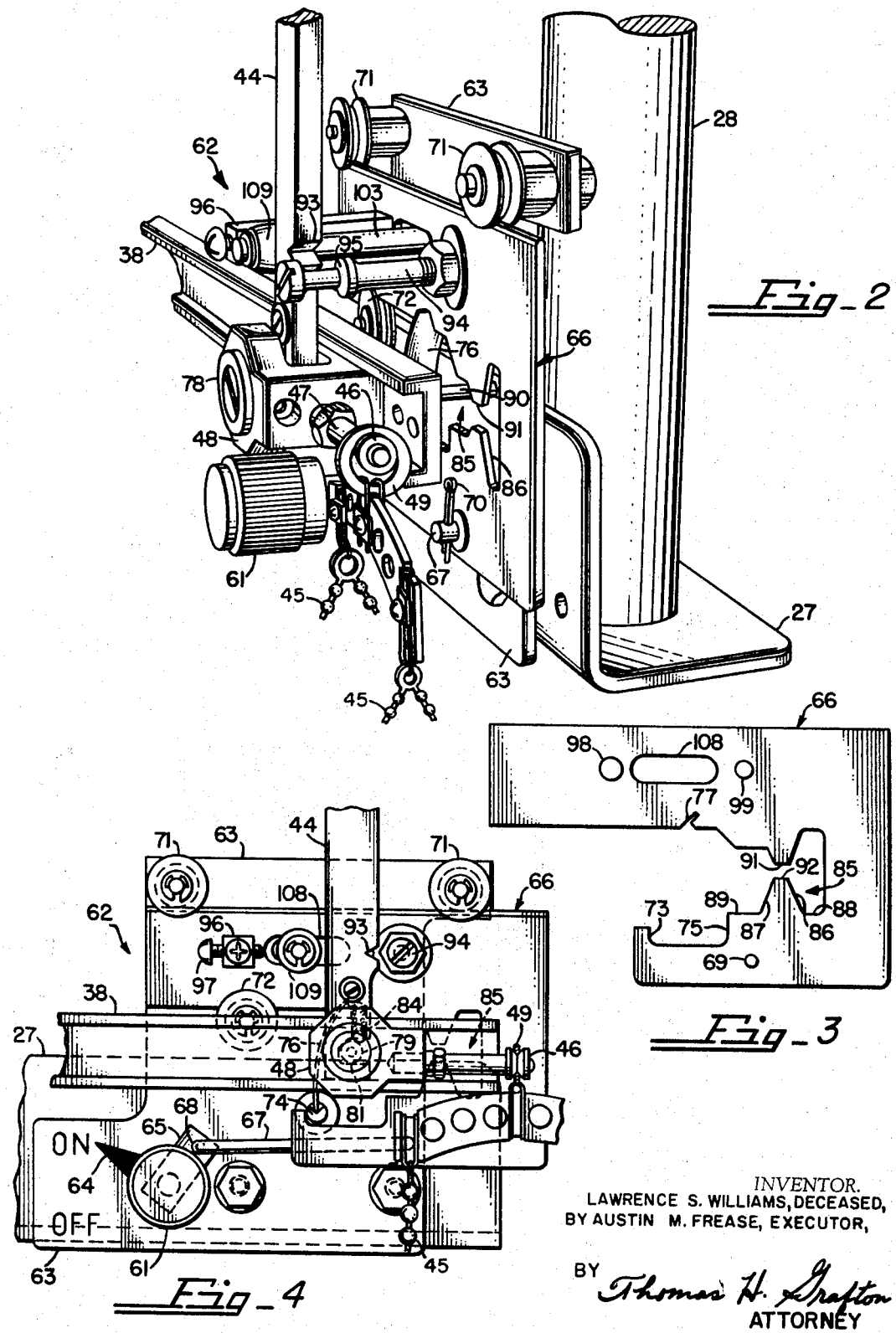

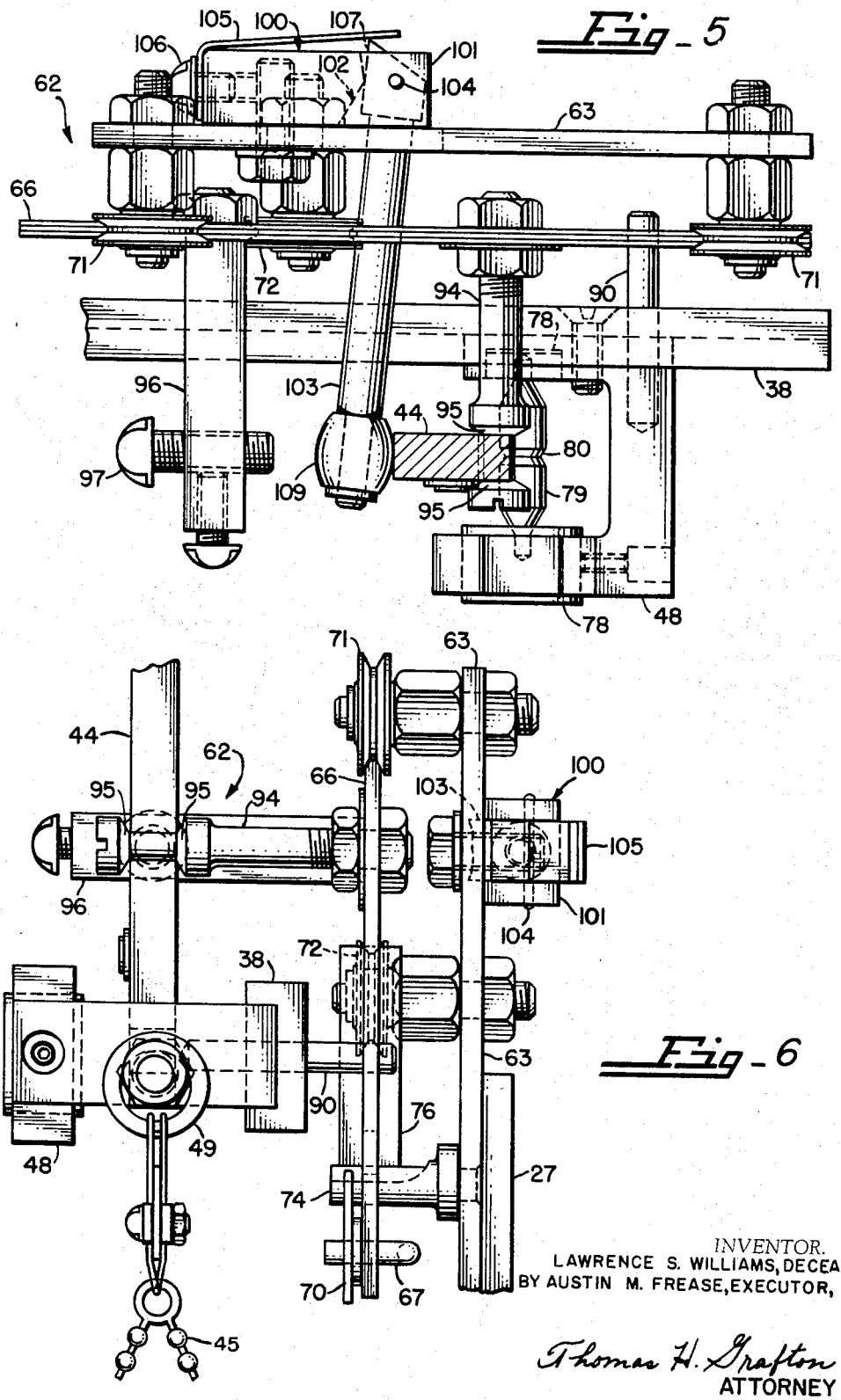

United States Patent Office 3,404,744
Patented Oct. 8, 1968

3,404,744
DISENABLING MECHANISM FOR LEVER IN RATIO BALANCE
Lawrence S. Williams, deceased, late of Toledo, Ohio, by Austin M. Frease, executor, Toledo, Ohio, assignor to The Reliance Electric and Engineering Company, Inc., Toledo, Ohio, a corporation of Ohio
Filed Aug. 12, 1966, Ser. No. 572,155
13 Claims. (Cl. 177—200)

ABSTRACT OF THE DISCLOSURE

A counting scale having a commodity receiver, three ratio pans, and lever means connecting each of the pans in a fixed ratio to the commodity receiver, each ratio being different from the other two. Knob-operated carriage means is used to selectively connect and disconnect the higher ratio pan and part of the lever means to and from the rest of the lever means to convert the scale to a triple ratio counting scale from a double ratio counting scale or vice versa.

---

This invention relates to improvements in counting weighing scales, and in particular to counting scales having a plurality of pans, each of which is a fixed ratio to a commodity receiver and in which the load counterbalancing and indicating mechanism is brought to a predetermined point when a load on the commodity receiver is balanced by specimens in the ratio pans. Scales of this type are used to count like parts, for packaging and issuing stock, in industrial concerns.

An example of such a counting scale is shown in United States Patent No. 1,80,443 issued Oct. 4, 1932 to H. O. Hem. This scale has two pans one having a ratio of 99:1 to the load receiver and the other having a ratio of 9:1 to the load receiver. The counting capacity of the scale can be increased by adding a third pan having a ratio of 999:1 to the load receiver. A three pan or triple ratio counting scale is disclosed in United States Patent No. 1,761,210 issued June 30, 1930 to Louis Jaenichen. The inertia of the long lever needed to attain the 999:1 ratio in triple ratio counting scales causes such scales to be very slow in attaining balance positions. Accordingly, it is the usual practice to disconnect the 999:1 ratio lever from the lever system when weighing small numbers of parts where only the two smaller ratio pans are used. This, however, is an unsatisfactory arrangement because prior 999:1 ratio levers are not balanced because force is needed to retain the knife edge pivots seated in their bearings and the removal of the unbalanced levers from the lever systems required poise weights to be moved to counterbalancing positions. If the scale operators forget to adjust the poise weights incorrect counting results.

The objects of this invention are to improve counting weighing scales, to facilitate the mechanical adjust of triple ratio counting weighing scales, to provide a triple ratio counting weighing scale with novel means for disconnecting and reconnecting the highest ratio pan from and to the scale's lever system to convert the triple ratio counting scale to a double ratio counting scale and vice versa, and to provide a triple ratio counting scale with a compression strut for driving the scale's highest ratio counting lever which lever and its adjuncts are balanced, whereby the lever and its pan can be added to or removed from the scale's lever system without need for compensating adjustments.

One embodiment of this invention enabling the realization of these objects includes a novel quick-change device incorporated in a triple ratio counting scale having a 999:1 ratio lever which is driven by a compressing strut that is put in or taken out of the lever system to add or remove the 999:1 ratio lever from the lever system by turning the knob of the quick-change device. No scale adjustments are needed because the 99:1 ratio lever and its adjuncts are balanced, this being one of the features of the counting scale. The quick-change device, another feature of the counting scale, includes a carriage connected to the knob and an over-center spring connected to the carriage. Rotation of the knob in one direction drives the carriage until the spring takes over and moves the carriage to a position wherein the lower end of the compression strut is driven to a point where the strut is connected into the scale's lever system. Novel structure ensures that the strut is correctly aligned prior to such connection. Rotation of the knob in the other direction causes the strut to be disconnected from the scale's lever system. Novel structure ensures that the removed strut is secured in a position wherein it cannot interfere with weighing. When the strut and, thus, the 999:1 ratio lever is connected to the lever system, the scale functions as a triple ratio counting scale. When the strut and, thus, the 999:1 ratio lever is disconnected from the lever system, the scale functions as a double ratio counting scale.

The above and other objects and features of this invention will be appreciated more fully from the following detailed description when read with reference to the accompanying drawings wherein:

FIG. 2 is an enlarged perspective view of the quick-change device shown in FIG. 1;

FIG. 3 is a front elevational view of part of the quick-change device shown in FIG. 2;

FIG. 4 is a front elevational view of all of the quick-change device shown in FIG. 2;

FIG. 5 is an enlarged horizontal sectional view taken along the line 5—5 of FIG. 1;

FIG. 6 is an enlarged and elevational view of the quick-change device as seen from a position to the right of FIG. 1.

Figure 1:
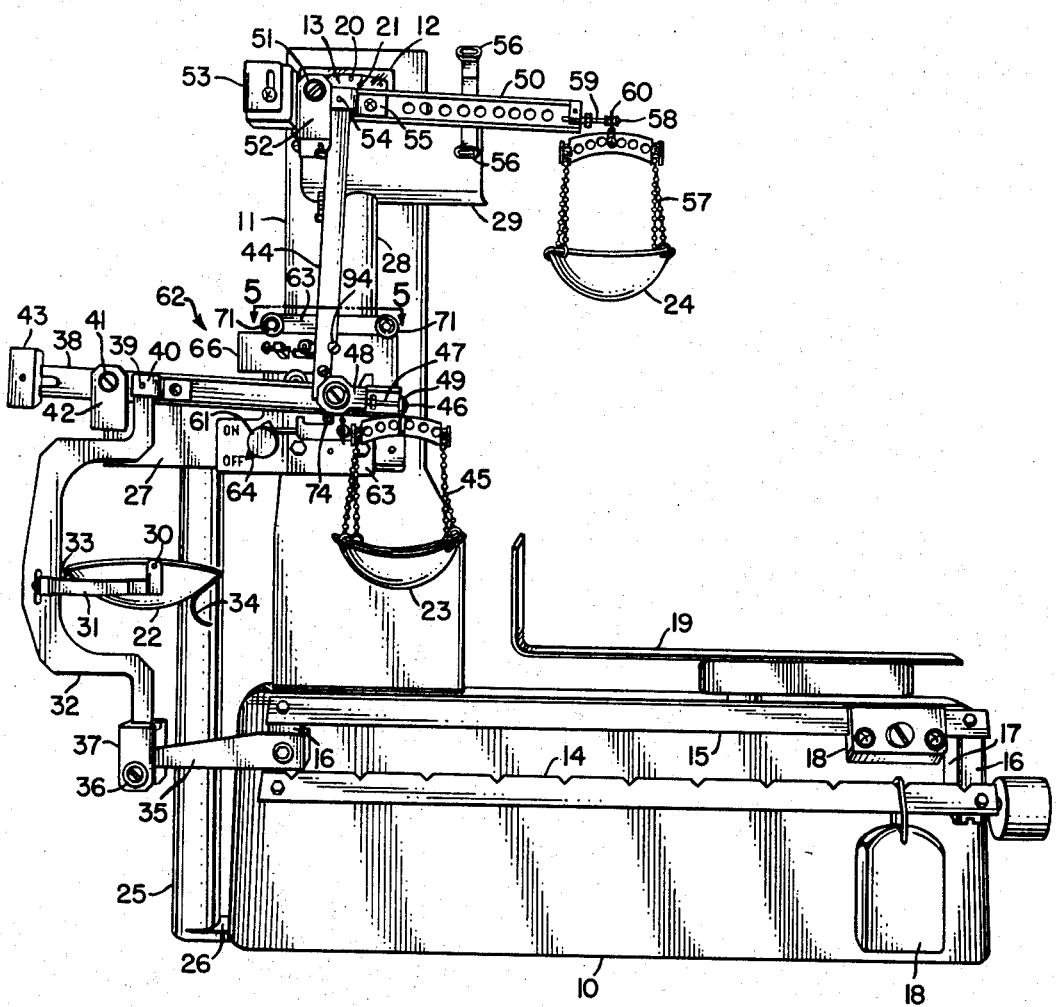
FIG. 1 is a front elevational view of the counting scale embodying the invention, parts being shown in perspective.

Referring to the drawings, in FIG. 1 a fan spring scale includes a base housing 10 which supports a chart housing 11 extending upwardly therefrom. The chart housing defines a window which is closed by glass 12 and through which is displayed a stationary chart 13. The base housing 10 and the weighing mechanism contained therein is exactly like their counterparts shown in U.S. Patent No. 3,181,634 issued May 4, 1965 to Lawrence S. Williams. The weighing scale shown in the patent has been altered to convert is from a fan scale to a counting scale by for one thing connecting beams 14 and 15 to the ball-bearing mounted lever (shown in the above U.S. Patent No. 3,181,634) contained within the base housing 10, such connection being made by attaching vertical plates 16, which connect the beams together, to side lever extensions (not shown) which extend through openings 17 (one shown) in the base housing 10. Hence, the beams 14 and 15 move together as one with the lever. Poises 18 on the beams are used to counterbalance tare weight. A platter 19 is exactly like its counterpart shown in the above U.S. Patent No. 3,181,634. The shape of the chart housing 11 also has been altered in converting the fan scale to a counting scale because the counting scale requires only a simple over-under chart having the "0" index mark 20. A load responsive indicator 21 is connected to the weighing mechanism in the same manner as is the indicator shown in the above U.S. Patent No. 3,181,634 and moves out of registration with the "0" index mark to give a visual indication of the out-of-balance condition of the scale. The scale in so far as it has been described may be considered to be an ordinary counting scale for the purpose of understanding the present invention.

9:1, 99:1 and 999:1 ratio pans 22, 23 and 24, respectively, are so operatively connected to the beams 14 and 15 that a single unit in each of the pans balances a predetermined number on the scale platter 19. A vertical post 25 is mounted from an extension 26 of the base housing 10 and it supports an angle 27 which in turn supports a second vertical post 28 that in turn supports an angle 29.

The 9:1 ratio pan 22 is pivotally mounted by means of pins 30 (one shown) between the arms 31 (one shown) of a strut 32. The pan 22 rests under the influence of gravity on a stop 33 and can be overturned by finger pressure on a handle 34 to empty articles out of the pan. An arm 35 extends from the left hand plate 16 as viewed in FIG. 1 as an extension of the beams 14 and 15 and it carries a stud (not shown) having ends mounted to rotate in ball bearings 36 contained in the furcations of a bifurcated bracket 37 depending from the strut 32. This provides an ordinary ball bearing connection between the strut 32 and the arm 35. The upper end of the strut 32 is pivotally connected to a 99:1 ratio lever 38 by means of a cone-pointed thrust bearing 39, in a bracket 40 carried by the lever 38, received in one side of a ball bearing (not shown) carried by the strut 32 and a stud (not shown) received in the other side of the ball bearing and carried by the lever 38.

The 99:1 ratio lever 38 is fulcrumed by means of a stud (not shown) mounted on the lever and having ends mounted to rotate in ball bearings 41 contained in the furcations of a bifurcated bracket 42 attached to the stationary angle 27, carries an adjustable balance weight 43 on its one end, and is selectively connectible to a compression strut 44 as described hereinafter. The 99:1 ratio pan 23 is suspended by chains 45 from a spool bearing 46 on an adjustment screw 47 threaded into a bifurcated bracket 48 carried by the lever 38. When the screw 47 is turned to make a ratio adjustment, e.g., change from 99:1 to 100:1, the spool bearing presents new surfaces to a circularly shaped pivot 49 carrying the pan 23 and automatically centers the pan. Because of the chain suspension, the pan is easy to tilt and dump out the sample piece.

A 999:1 ratio lever 50 is fulcrumed by means of a stud (not shown) fixed in and extending through the lever and having ends mounted to rotate in ball bearings 51 contained in the furcations of a bifurcated bracket 52 attached to the stationary angle 29, carries an adjustable balance weight 53, and is pivotally connected to the upper end of the strut 44 by means of a cone-pointed thrust bearing 54, in a bracket 55 carried by the lever 50, received in one side of a ball bearing (not shown) carried by the strut 44 and a stud (not shown) received in the other side of the ball bearing and carried by the lever 50. The lever 50 is movable between stops 56 carried by the angle 29 and carries the ratio pan 24 at its end remote from the balance weight 53. The pan 24 is connected to the lever 50 in the same manner as the pan 23 is connected to the lever 38 as described above, the pan 24 connection including chains 57, spool bearing 58, adjustment screw 59, and pivot 60.

The 999:1 ratio lever 50 is driven by the compression strut 44 which is put in or taken out of the system to add or remove the 999:1 ratio lever to or from the lever system by turning a knob 61 of a novel quick-change device 62. No scale adjustments are needed when the lever 50 is added to or removed from the system because the lever 50 and its adjuncts are balanced, this being one of the features of the counting scale. The inertia of the lever 50 causes the scale to be very slow in attaining balance positions. Accordingly, it is the usual practice to disconnect such a lever from the lever system when weighing small numbers of parts where only the two smaller ratio pans are used. This prior practice is unsatisfactory because force is needed to retain the prior knife edge pivots seated in their bearings (force produced by unbalanced 999:1 ratio levers) and the removal or the addition of the unbalanced levers required poise weights to be moved to counterbalancing positions. If the scale operators forget to adjust the poise weights incorrect counting results. The balance weight 53 is so positioned that when the compression strut 44 is disconnected or reconnected by operation of the quick-change device 62 to remove or add the lever 50 from or to the lever system the position of the indicator 21 is not affected.

When the quick-change device 62 is operated to remove the 999:1 ratio lever 50 from the system, the scale operates in exactly the same manner as does the double ratio scale disclosed in the above U.S. Patent No. 1,880,-443. That is, the 99:1 ratio pan 23 corresponds to the 99:1 ratio pan (pan 33 in the patent) and the 9:1 ratio pan 22 corresponds to the 9:1 ratio pan (pan 32 in the patent) and the scale is used in packing like articles in lots of a certain number of pieces or when it is desired to ascertain the number of articles in a lot. When the quick-change device 62 is operated to connect the 999:1 ratio lever into the system, the scale operates in the same manner as does the triple ratio scale disclosed in the above U.S. Patent No. 1,761,210. That is, pans 22–24 correspond to their counterparts in the patent (pans 25–27, respectively, in the patent).

The quick-change device 62 includes a stationary plate 63 fixed to the angle 27 bearing the words "ON" and "OFF" to one or the other of which a pointer 64 on the knob 61 points, the knob 61 being journaled for rotation on the plate 63. The knob 61 has an arm 65 fixed thereto and the arm 65 is connected to a carriage 66 by means of a rod 67 having its ends bent at right angles out of its axis for connection one pivotally in an opening 68 in the arm 65 and one pivotally in an opening 69 (FIG. 3) in the carriage 66 which end in the opening 69 is retained by means of a cotter pin 70 as shown in FIG. 2. The carriage 66 is mounted to roll between two upper sheave-like rollers 71 and one lower sheave-like roller 72, which rollers 71–72 are pivotally mounted on the plate 63. Movement of the pointer 64 from "OFF" to "ON" (FIG. 4 position) causes the carriage 66 to be driven until a surface 73 (FIG. 3) engages a stop 74 extending from the plate 63. Movement of the pointer 64 from "ON" to "OFF" (FIG. 1 position) causes the carriage 66 to be driven until a surface 75 engages the stop 74.

Figure 7:
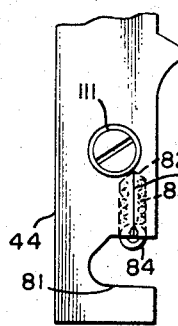
FIG. 7 is a fragmentary view showing a portion of the quick-change device when it is in its disconnected position.

The stop 74 defines a V-groove which receives an end of an over-center leaf spring 76 having its other end received in a notch 77 (FIG. 3) in the carriage 66. The bracket 48 carried by the lever 38 is provided with ball bearings 78 in each of its legs which receive a rotatable shaft 79 (FIG. 5) therebetween. The shaft 79 is provided with a circumferential V-groove 80. The compression strut 44 is provided with a mouth 81 at its lower end which in the "ON" position of the carriage 66 shown in FIG. 4 receives the shaft 79 and in the "OFF" position is out of engagement with the shaft 79 as shown in FIG. 7. Above the mouth 81, the strut 44 has an opening 82 which contains a coil spring 83 and a ball 84 (ball detent). The V-groove 80 serves as a centering guide. When the strut 44 is moved from its inoperative position shown in FIGS. 1 and 7 to its operative position shown in FIG. 4, the ball 84 runs in the groove 80 until it is snapped by its spring 83 into its position shown in FIG. 4 wherein it pulls the strut 44 against the shaft 79. The ball 84 has a hole drilled through it like a bead and a wire 110 (FIG. 7) held in a shallow groove to the side of the strut by means of a screw 111 has its free end bent over and threaded through the bead to hold the bead (ball 84) in place when the strut 44 is separated from the shaft 79 as shown in FIG. 7.

The carriage 66 has a cam portion 85 having first and second lifting surfaces 86 and 87 and first and second bottom stop surfaces 88 and 89, and the lever 38 carries a cam-following pin 90. The cam portion 85 also has a hold down surface 91. When the carriage 66 is in its "OFF" position (FIG. 1), downward movement of the lever 38 at the right hand end as viewed in FIG. 1 is limited by engagement of the pin 90 with the bottom stop surface 88. As the carriage 66 moves to the right as viewed in FIG. 1, the pin 90 follows the cam surface 86 upwardly and lifts such right hand lever end upwardly to align the strut mouth 81 with the shaft 79 and continued movement of the carriage 66 causes the pin 90 to move between the hold down surface 91 on the cam portion 85 and a juxtaposed surface 92 on the cam portion 85 to maintain the alignment until the detent ball 84 is received in the alignment groove 80 in the shaft 79. After the detent ball 84 snaps in place (FIG. 4), the pin 90 has passed between the cam surfaces 91 and 92 and then serves to limit downward movement of the lever 38 by engagement with the bottom stop surface 89. When the pin 90 is against the stop surface 89, the lever 50 (FIG. 1) is against its lower stop 56. The strut 44 has a V-groove 93 which receives a pin 94, carried by the carriage 66, when the carriage 66 is in its "OFF" position, the pin 94 being provided with two spaced faces 95 which prevent movement of the strut 44 toward or away from the carriage 66. As the carriage 66 moves to the left, the pin 90 follows the cam surface 87 upwardly and lifts the lever 38 upwardly to align the strut notch 93 with the pin 94. Continued movement of the carriage 66 to the left drives the pin 94 into the strut notch 93 and the strut 44 into its inoperative or disconnected position shown in FIGS. 1 and 7.

The carriage 66 carries a pin 96 which in turn carries a screw 97, the pin 96 being fixed in a hole 98 (FIG. 3) in the carriage 66; the pin 94 is fixed in a hole 99 in the carriage 66. The stationary plate 63 carries a block 100 having a bifurcated end 101 defining a V-bearing 102 between its furcations on which pivots an arm 103 which is pivotally mounted by means of a pin 104 extending between such furcations. A leaf spring 105 which is held in place on the block 100 by means of a screw 106 threaded into the block 100 biases the arm 103 so that its end at the strut 44 is urged to the right as viewed in FIG. 5 (carriage 66 in its "OFF" position). In a second position of the arm 103, the end of the arm 103 lays flush on a stop surface 107 (FIG. 5) of the V-bearing 102 (carriage 66 in its "ON" position). The arm 103 extends through an oversize slot 108 (FIGS. 3 and 4) in the carriage 66 which provides clearance for the pivotal movement of the arm 103. A roller 109 is carried on the free end of the arm 103.

In operation, when the quick-change device 62 is in its "OFF" position (FIGS. 1, 5 and 7), the strut 44 is disconnected from the shaft 79 to remove the 999:1 ratio lever 50 from the system. The counting scale then operates as a double ratio counting scale. In the "OFF" position, the strut 44 cannot move to the right or toward the carriage 66 or away from the carriage 66 as viewed in FIG. 1 because of the pin 94 and its two faces 95 (pin 94 received in the strut notch 93), and the strut 44 cannot move to the left because of its engagement with the roller 109 (see FIG. 5), the spring 105 keeping the roller 109 against the strut 44. Thus, the strut 44 is held in a position where it cannot interfere with weighing. When the knob 61 is turned to drive the carriage 66 to its "ON" position, the carriage at first is driven by the manual effort until the over-center spring 76 takes over and drives it with a snap as far as the rod 67 permits. As the carriage 66 moves from its "OFF" to its "ON" position, the strut 44 is driven by three means each acting during different parts of the cycle. At first the spring-biased roller 109 pushes the strut 44 to the right as viewed in FIG. 5, then the screw 97 carried by the pin 96 on the carriage 66 catches up with the roller 109 and drives it until near the very end of the movement; the detent ball 84 snaps into its position shown in FIG. 4 and moves the strut 44 into its final position where it is connected to the shaft 79 and thus to the lever 38. This adds the 999:1 lever 50 into the system. In the connected position of the strut 44, the roller 109 is spaced slightly from the strut 44, the stop surface 107 (FIG. 5) on the V-bearing 102 serving to accurately hold the roller 109 out of engagement with the strut 44 where the roller 109 cannot interfere with weighing. As previously described, as the carriage moves out of its "OFF" position, the pin 90 follows the cam surface 86 upwardly and lifts the lever 38 upwardly to align the strut mouth 81 with the shaft 79.

The scale is converted from a triple ratio counting scale to a double ratio counting scale by turning the knob 61 to drive the carriage 66 to its "OFF" position. At first the carriage is driven by the manual effort until the over-center spring 76 takes over and drives it with a snap as far as the rod 67 permits. As the carriage 66 moves from its "ON" to its "OFF" position, the pin 90 follows the cam surface 87 upwardly and lifts the lever 38 upwardly to align the strut notch 93 with the pin 94. Continued movement of the carriage drives the pin 94 into the strut mouth 93 and then the strut 44 in opposition to the springs 105 into its disconnected position shown in FIGS. 1 and 7.

The quick-change device 62 changes the scale from a double ratio to a triple ratio counting scale or vice versa by rotation of the knob 61. Rotation of the knob 61 in one direction drives the carriage 66 until the over-center spring 76 takes over and moves the carriage to a position wherein the lower end of the strut 44 is driven to a point where the strut is connected into the lever system. The cam portion 85 of the carriage by cooperation with the cam-following pin 90 positions the lever 38 so that the strut 44 is correctly aligned with the shaft 79 prior to such connection. Rotation of the knob 61 in the other direction causes the strut 44 to be disconnected from the lever system. The cam portion 85 of the carriage by cooperation with the cam-following pin 90 positions the lever 38 so that the strut notch 93 is correctly aligned with the pin 94 to receive the pin. The pin 94 and the notch 93 are part of a means for securing the disconnected strut 44 in position wherein it cannot interfere with weighing. When the strut 44 and, thus, the 999:1 ratio lever 50 is connected to the lever system, the scale functions as a triple ratio counting scale. When the strut 44 and, thus, the 999:1 ratio lever 50 is disconnected from the lever system, the scale functions as a double ratio counting scale.

It is to be understood that the above description is illustrative of this invention and that various modifications thereof can be utilized without departing from its spirit and scope.

What is claimed is:

1. In a counting weighing scale, in combination, a commodity receiver, three ratio pans, lever means connecting each of the pans in a fixed ratio to the commodity receiver, each ratio being different from the other two, and carriage means for connecting and disconnecting the higher ratio pan and part of the lever means to and from the rest of the lever means to convert the scale to a triple ratio counting scale from a double ratio counting scale or to a double ratio counting scale from a triple ratio counting scale.

2. A counting weighing scale according to claim 1 wherein said higher ratio pan and said part of the lever means are balanced, whereby no scale adjustments are needed after an occurrence of said conversion from one ratio to the other.

3. A counting weighing scale according to claim 1 wherein the two higher ratio pans are connected by means including spool bearings to the lever means.

4. A counting weighing scale according to claim 3 wherein each of the spool bearings is carried on adjustment means for selectively varying the fixed ratios of the two higher ratio pans.

5. In a counting scale, in combination, double ratio counting scale means, pivotally mounted third ratio lever means, a strut operatively connected to the lever means, and lever or knob-operated means for connecting or disconnecting the strut to or from the double ratio counting scale means for converting the counting scale from a double ratio scale to a triple ratio scale or from a triple ratio scale to a double ratio scale.

6. A counting scale according to claim 5 wherein a spring biased ball detent carried by the strut maintains the strut detachably connected to said double ratio counting scale means.

7. A counting weighing scale according to claim 5 wherein the lever or knob-operated means includes carriage means.

8. A counting weighing scale according to claim 7 wherein the carriage means includes a carriage and two arms carried by the carriage one on either side of the strut for driving the strut toward connected and disconnected positions.

9. A counting weighing scale according to claim 7 wherein the carriage means includes cam means and a cam follower is provided on said double ratio counting scale means cooperating with the cam means for aligning said scale means relative to said strut prior to connecting said strut to said scale means.

10. A counting scale according to claim 7 wherein the lever or knob-operated means includes over-center spring means for maintaining said carriage means in one of two positions.

11. A counting scale according to claim 8 wherein the strut defines a notch which in a disconnected position of the strut receives one of said arms for holding the strut out of engagement with working parts during operation of the scale.

12. In a counting scale, in combination, double ratio counting scale means, pivotally mounted third ratio lever means, a strut operatively connected to the lever means, and means including a carriage for connecting or disconnecting the strut to or from the double ratio counting scale means for converting the counting scale from a double ratio scale to a triple ratio scale or from a triple ratio scale to a double ratio scale.

13. In a counting scale, in combination, double ratio counting scale means, pivotally mounted third ratio lever means, a strut operatively connected to the lever means, the strut defining a mouth, and means including a shaft carried by the double ratio counting scale means and receivable in the mouth for connecting or disconnecting the strut to or from the double ratio counting scale means for converting the counting scale from a double ratio scale to a triple ratio scale or from a triple ratio scale to a double ratio scale.

References Cited

UNITED STATES PATENTS

| | | | |
|---|---|---|---|
| 1,761,210 | 6/1930 | Jaenichen | 177—200 |
| 1,790,883 | 2/1931 | Thomas | 177—200 |
| 1,853,618 | 4/1932 | Jaenichen | 177—200 |
| 1,880,443 | 10/1932 | Hem | 177—200 |
| 2,193,660 | 3/1940 | Williams | 177—200 |
| 2,250,294 | 7/1941 | Carliss | 177—200 |
| 2,484,324 | 10/1949 | Thorsson | 177—200 |

ROBERT S. WARD, JR., *Primary Examiner.*

GEORGE H. MILLER, JR., *Assistant Examiner.*